Patented July 22, 1941

2,249,749

UNITED STATES PATENT OFFICE 2,249,749

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application November 14, 1939, Serial No. 304,364

15 Claims. (Cl. 260—152)

This invention relates to azo compounds and their application to the art of dyeing or coloring.

We have discovered that the azo compounds having the general formula:

$$A-N=N-R$$

wherein A represents the residue of a member selected from the group consisting of an aryl nucleus of the benzene series and a benzothiazole nucleus, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

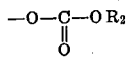

group, wherein $R_2$ represents a member selected from the group consisting of an alkyl group, a cycloalkyl group, an allyl group, a phenyl nucleus and a furyl group, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

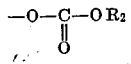

group, wherein $R_2$ has the meaning given above, attached thereto, constitute a valuable class of compounds. Depending upon their structure the azo compounds of our invention possess application for the dyeing or coloration of organic derivatives of cellulose, silk and wool.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivatives of cellulose that our invention is particularly directed. These nuclear non-sulfonated compounds likewise possess some application for the dyeing of wool and silk. For the dyeing of organic derivatives of cellulose such as cellulose acetate silk, nuclear non-sulfonated dye compounds wherein A is an aryl nucleus of the benzene series and R is a phenyl nucleus are generally advantageous.

The nuclear sulfonated compounds of our invention have little or no utility for the dyeing of organic derivatives of cellulose but possess application for the dyeing of silk and wool. Preferably when the dye compounds of our invention are to be employed for the dyeing of organic derivatives of cellulose, they should contain no nuclear free carboxylic acid group. Red, yellow, orange-yellow, orange-red, blue-green, blue and violet dyeings, for example, can be obtained employing the dye compounds of our invention.

It is an object of our invention to provide a new class of azo dyes suitable for the dyeing or coloration of textile materials made of or containing an organic derivative of cellulose, wool and silk. Another object of our invention is to provide a process for the dyeing or coloration of organic derivatives of cellulose, wool and silk. A further object is to produce dyed textile materials which are of good fastness to light and washing. A particular object of our invention is to provide a new class of nuclear non-sulfonated azo dyes suitable for the dyeing or coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While our invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo compounds of our invention can be prepared by diazotizing a diazotizable member selected from the group consisting of an arylamine of the benzene series and an aminobenzothiazole and coupling the diazonium compound obtained with a coupling component selected from the group consisting of a benzene, a naphthalene, a tetrahydroquinoline and phenmorpholine nucleus, wherein said benzene and naphthalene nuclei contain an aliphaticamino group having a

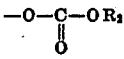

group wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

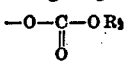

group, wherein $R_2$ has the meaning just assigned to it, attached thereto.

While any coupling component of the character above defined can be employed in the preparation of the azo compounds of our invention, the benzene and naphthalene coupling components ordinarily employed by us can be represented by the general formula:

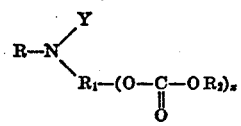

wherein R represents a phenyl or naphthyl nucleus, $R_1$ represents an aliphatic group, $R_2$ represents an alkyl group, a cycloalkyl group, an allyl group, a furyl group or a phenyl nucleus, $x$ represents 1 or 2 and Y represents hydrogen, an alkyl group, an allyl group, an aralkyl group, a phenyl nucleus and a furyl group.

Similarly the tetrahydroquinoline and phenmorpholine coupling components ordinarily employed in the preparation of the azo compounds of our invention consist of a tetrahydroquinoline or phenmorpholine containing a

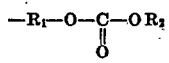

group, wherein $R_1$ and $R_2$ have the meaning previously assigned to them, attached to the nuclear nitrogen atom.

Illustrative of the grouping represented by the formula:

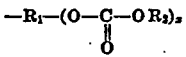

may be mentioned

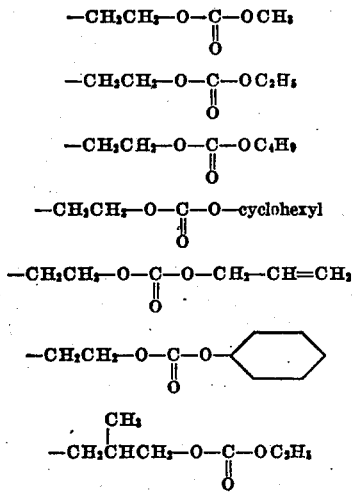

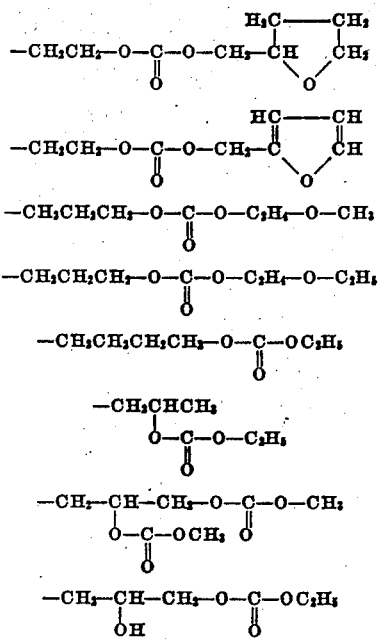

and

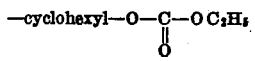

It will be understood that the above groups are intended to be illustrative and not limitative of our invention. Each of these groupings, for example, can be attached to the phenyl, naphthyl, tetrahydroquinoline or phenmorpholine nucleus in the manner previously stated.

The following examples illustrate the preparation of the azo compounds of our invention:

Example 1

12.6 grams of o-chloroaniline are dissolved in a mixture of 150 cc. of water and 25 cc. of 36% hydrochloric acid. The resulting solution is cooled to a temperature approximating 0–5° C. by the addition of ice, for example, and diazotized by adding, with stirring, 6.9 parts of sodium nitrite dissolved in water.

21 grams of the ethyl carbonate of β-hydroxyethyl-m-toluidine having the formula:

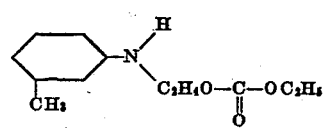

are dissolved in a dilute aqueous hydrochloric acid solution and the resulting mixture is cooled to a temperature approximating 0–10° C. The diazo solution prepared above is then added to this mixture with stirring. After the addition of the diazo solution, the mixture is permitted to stand for a short time following which it is slowly made neutral to Congo red paper by the addition of sodium acetate. Upon completion of the coupling reaction, the dye compound formed is recovered by filtration, washed with water and dried. The dye compound obtained colors cellulose acetate silk a yellow shade.

23.7 grams of the ethyl carbonate of ethyl-β-hydroxyethyl aniline can be substituted for the coupling component of the example to obtain a dye which similarly colors cellulose acetate silk a yellow shade. The diazonium form of 1-amino-2-chloro-4-methylbenzene may also be coupled with this coupling component to obtain a dye which colors cellulose acetate silk a yellow shade. Similarly, the diazo form of p-nitroaniline may also be coupled with both the coupling components mentioned to obtain dyes which color cellulose acetate silk a yellow shade.

Example 2

15 grams of methylanthranilate are diazotized and the diazonium compound obtained is coupled with 31 grams of the methylcarbonate of γ-hydroxypropylbenzyl-m-toluidine having the formula:

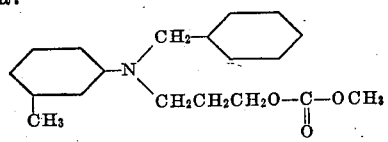

The diazotization and coupling reactions may be carried out as described in Example 1. The dye compound obtained colors cellulose acetate silk a yellow shade.

Example 3

21.7 grams of 1-amino-2-bromo-4-nitroaniline are diazotized in known fashion and the diazonium compound formed is coupled with 28.3 grams of

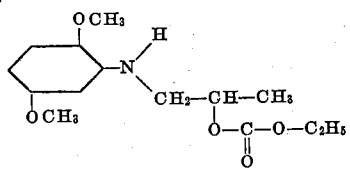

Coupling and recovery of the dye compound may be carried out as described in Example 1. The dye compound obtained colors cellulose acetate silk a violet shade.

Example 4

13.8 grams of p-nitroaniline are diazotized and the diazonium compound obtained is coupled with 31 grams of the dimethylcarbonate of di-β-hydroxyethyl-m-toluidine having the formula:

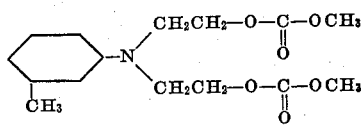

The diazotization, coupling and recovery of the dye compound may be carried out in accordance with the general method described in Example 1. The dye compound obtained colors cellulose acetate silk a red shade.

The coupling component of this example may also be coupled with the diazo form of 1-amino-2-chloro-4-methylbenzene, for example, to obtain a dye which colors cellulose acetate silk a rubine shade.

Example 5

16.3 grams of 1-amino-2-chloro-4-nitrobenzene are diazotized in known fashion and the diazonium compound obtained is coupled with 26.1 grams of the methylcarbonate of 1-β-hydroxyethylamino-5-naphthol. Coupling and recovery of the dye compound formed can be carried out in accordance with the method described in Example 1. The dye compound obtained colors cellulose acetate silk a blue shade.

The coupling component of this example may likewise be coupled with the diazo form of 1-amino-2,4-dinitrobenzene, for example, to obtain a dye which colors cellulose acetate silk a blue shade.

Example 6

26.3 grams of 1-amino-2,4-dinitro-6-bromobenzene are diazotized in known fashion and the diazonium compound obtained is coupled with 29 grams of the monoethylcarbonate of glyceryl-α-naphthylamine. Coupling and recovery of the dye compound formed may be carried out in accordance with the method described in Example 1. The dye compound obtained colors cellulose acetate silk a blue shade.

Example 7

19.7 grams of p-aminoazobenzene are diazotized in known fashion and the diazonium compound obtained is coupled with 34 grams of

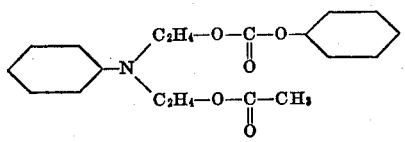

Coupling and recovery of the dye compound formed can be carried out in accordance with the method described in Example 1. The dye compound obtained colors cellulose acetate silk an orange-red shade.

Example 8

13.8 grams of p-nitroaniline are diazotized in known fashion and the diazonium compound obtained is coupled with the ethylcarbonate of 1-β-hydroxyethylphenmorpholine having the formula:

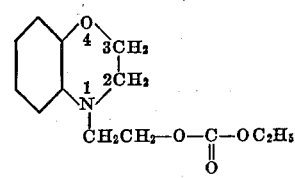

Coupling and recovery of the dye compound formed can be carried out in accordance with the method described in Example 1. The dye compound obtained colors cellulose acetate silk a rubine shade.

Example 9

16.3 grams of 1-amino-2-chloro-4-nitrobenzene are diazotized in known fashion and the diazonium compound obtained is coupled with the ethylcarbonate of 1-β-hydroxyethyltetrahydroquinoline having the formula:

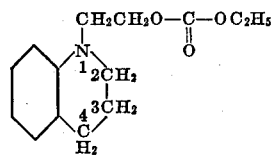

Coupling and recovery of the dye compound formed can be carried out in accordance with the method described in Example 1. The dye compound obtained colors cellulose acetate silk a rubine shade.

Example 10

13.5 grams of p-aminoacetophenone are diazotized in known fashion and the diazonium compound obtained is coupled with 33 grams of the monomethoxyethylcarbonate of 1-glycerylamino-2-methoxy-5-methylbenzene. Coupling and recovery of the dye compound formed can be carried out in accordance with the method described in Example 1. The dye compound obtained colors cellulose acetate silk an orange shade.

32.7 grams of the monoethylcarbonate of glycerylbenzylaniline can be substituted for the coupling component of this example to obtain a dye compound which colors cellulose acetate silk an orange shade.

Similarly, an equivalent gram molecular weight of

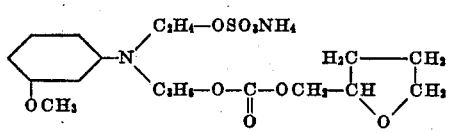

can be substituted for the coupling component of the example to obtain a dye compound which colors cellulose acetate silk a red shade.

*Example 11*

18.3 grams of 2,4-dinitroaniline are diazotized in known fashion and the diazonium compound obtained is coupled with an equivalent gram molecular weight of the mono-, di- or tri-ethyl-carbonate of β-hydroxyethylglycerylcresidine. Coupling and recovery of the dye compounds formed can be carried out in accordance with the method described in Example 1. The dye compounds obtained color cellulose acetate silk a violent shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 11, inclusive.

| Amine | Coupling component | Color |
|---|---|---|
| o-(Cl, Br, F, I)-aniline | 1. Mono-methyl carbonate of 1-glycerylamino-3-(Cl, Br, F, I)-benzene | Yellow. |
| Do | 2. [structure with Br, N(C₂H₅)(CH₂CH₂—O—C(O)—OC₂H₅)] | Do. |
| Do | 3. [structure with N(C₂H₄OH)(C₂H₄—O—C(O)—OCH₂CH₂CH₃)] | Do. |
| Do | 4. [structure with OCH₃, Cl, N(C₂H₄SO₃Na)(C₂H₄—O—C(O)—OCH₂CH₂CH₃)] | Do. |
| Do | 5. [structure with NH—CH₂CH₂CH₂CH₂—O—C(O)—OC₂H₅] | Do. |
| Do | 6. [structure with N(C₂H₄—O—C(O)—OC₂H₅)(C₂H₄—O—C(O)—OC₂H₅)] | Do. |
| Do | 7. Di-ethyl carbonate of 1-glycerylamino-3-methyl benzene | Do. |
| Do | 8. [structure with CH₃, N(C₂H₄—O—C(O)—OC₂H₅)₂] | Do. |
| Do | 9. [structure with Cl, NH—C₂H₄—O—C(O)—O—CH₂—CH(—O—)CH—CH₃ with H₂C—CH₃] | Do. |
| Do | 10. [structure with CH₃, N(CH₂—CH=CH₂)(C₂H₄—O—C(O)—OC₂H₅)] | Do. |
| Do | 11. [structure with OCH₃, CH₃, N(cyclohexyl)(C₂H₄—O—C(O)—OC₂H₄—OC₂H₅)] | Do. |

| Amine | Coupling component | Color |
|---|---|---|
| o-(Cl, Br, F, I)-aniline | 12. ⬡—N(phenyl)(C₂H₄—O—C(=O)—OC₂H₅) | Yellow. |
| Do | 13. ⬡(CH₃)—NH—C₂H₄—O—C(=O)—OCH₂CH=CH₂ | Do. |
| Do | 14. ⬡—NH—C₂H₄—O—C(=O)—O—cyclohexyl | Do. |
| Do | 15. ⬡ with N(C₂H₄—O—C(=O)—OC₂H₅), CH₂, CHOH, CH₂ ring | Do. |
| Do | 16. ⬡ with OCH₃, O—CH₂—CH₂—N(C₂H₄—O—C(=O)—OCH₃) | Do. |
| Do | 17. naphthyl—NH—C₂H₄—O—C(=O)—OC₂H₅, OH | Do. |
| Do | 18. Cl, Cl, OH substituted naphthyl—N(C₂H₅)(C₂H₄—O—C(=O)—OC₂H₅) | Do. |
| Do | 19. naphthyl(CH₃)—NH—C₂H₄—O—C(=O)—OCH₃ | Do. |
| Do | 20. naphthyl(OCH₃)—NH—C₂H₄—O—C(=O)—O—CH₂—CH(—O—)CH(CH₃)—(H₃C)CH | Do. |
| Methylanthranilate | Coupling components 1–20 | Yellow to red. |
| 1-amino-2-chloro-4-methylbenzene | do | Do. |
| 1-amino-2-bromo-4-ethoxybenzene | do | Do. |
| p-Aminoacetophenone | do | Orange to rubine. |
| m-Nitroaniline | do | Do. |
| 1-amino-3-nitro-6-methylbenzene | do | Do. |
| 1-amino-3-nitro-6-methoxybenzene | do | Do. |
| 1-amino-3-nitro-6-chlorobenzene | do | Do. |
| p-Nitroaniline | do | Orange to blue. |
| o-Nitroaniline | do | Orange to violet. |
| 1-amino-2-methyl-4-nitrobenzene | do | Orange to blue. |
| 1-amino-2-methoxy-4-nitrobenzene | do | Do. |
| 1-amino-2-(Cl,Br,F,I)-4-nitrobenzene | do | Do. |
| 1-amino-2-cyano-4-nitrobenzene | do | Do. |
| p-Aminoazobenzene | do | Do. |
| 1-amino-2,4-dinitro-6-(Cl,Br,F)benzene | do | Orange to blue-green. |
| 2-amino-6-methoxy-benzothiazole | do | Orange to blue. |
| 2,4-dinitroaniline | do | Do. |

| Amine | Coupling component | Color |
|---|---|---|
| 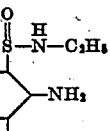 | 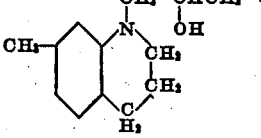 | Blue. |
| Do | 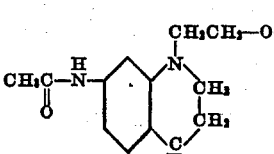 | Do. |
| Do | 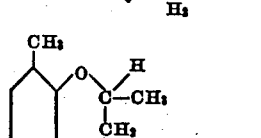 | Do. |
| 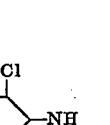 | 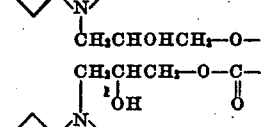 | Do. |

The nuclear sulfonated compounds of our invention can be prepared by sulfonation of the unsulfonated compounds disclosed herein or by the use of previously sulfonated components. Thus, p-nitroaniline-o-sulfonic acid, o-sulfoaniline or p-sulfoaniline, for example, can be diazotized and the diazonium compounds obtained coupled with any of the foregoing coupling components to obtain dye compounds of our invention which are suitable for the coloration of wool and silk. The sulfonation operation just referred to can be carried out in accordance with any suitable known method.

In order that our invention may be completely understood, the preparation of the coupling components employed in the preparation of the compounds of our invention is given hereinafter. The benzene and naphthalene coupling components can be prepared by reacting a benzene or naphthalene compound having a hydroxy-aliphaticamino group attached to the nucleus with a (alkyl-, cycloalkyl-, allyl-, phenyl- or furyl-) cholorocarbonate. The phenmorpholine and tetrahydroquinoline coupling components can be prepared by reacting a phenmorpholine or tetrahydroquinoline compound containing a hydroxyaliphatic group attached to the nuclear nitrogen atom with the chlorocarbonates above mentioned. The reaction can be carried out in the presence of an inert solvent or diluent medium, such as pyridine, at room temperature. To illustrate, the methyl carbonate of γ-hydroxypropyl benzyl-m-toluidine can be prepared by treating γ-hydroxypropyl benzyl-m-toluidine with methylchlorocarbonate; the ethylcarbonate of β-hydroxyethyl-m-toluidine can be prepared by treating β-hydroxyethyl-m-toluidine with ethylchlorocarbonate; the furylcarbonate of ethyl-β-hydroxyethylaniline can be prepared by treating ethyl-β-hydroxyethylaniline with furylchlorocarbonate; the allyl carbonate of β-hydroxyethylaniline can be prepared by reacting β-hydroxyethylaniline with allylchlorocarbonate and the cyclohexylcarbonate of γ-hydroxypropylaniline can be prepared by reacting γ-hydroxypropylaniline with cyclohexylchlorocarbonate.

The chlorocarbonate compounds referred to above can be prepared by reacting the corresponding alcohol with phosgene in the cold. Thus methylchlorocarbonate, ethylchlorocarbonate, furylchlorocarbonate, cyclohexylchlorocarbonate and allylchlorocarbonate can be prepared by reacting methyl alcohol, ethyl alcohol, furfuryl alcohol, cyclohexyl alcohol and allyl alcohol, respectively, with phosgene.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials, reference may be had to our U. S. Letters Patent No. 2,107,898, issued February 8, 1938.

We claim:

1. The azo compounds having the general formula:

wherein A represents the residue of a member selected from the group consisting of an aryl nucleus of the benzene series and a benzothiazole nucleus, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

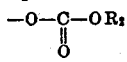

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

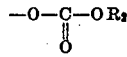

group, wherein $R_2$ has the meaning given above, attached thereto.

2. The azo compounds having the general formula:

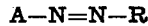

wherein A represents the residue of an aryl nucleus of the benzene series, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

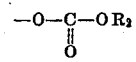

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

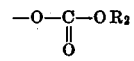

group, wherein $R_2$ has the meaning given above, attached thereto.

3. The azo compounds have the general formula:

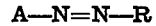

wherein A represents the residue of a member selected from the group consisting of an aryl nucleus of the benzene series and a benzothiazole nucleus and R represents a phenyl nucleus containing an aliphaticamino group in para position to the azo bond, said aliphaticamino group having a

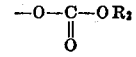

group, wherein $R_2$ represents a member selected from the group consisting of alkyl, cycloalkyl, allyl, phenyl and furyl.

4. The azo compounds having the general formula:

wherein A represents the residue of a member selected from the group consisting of an aryl nucleus of the benzene series and a benzothiazole nucleus and R represents a tetrahydroquinoline nucleus containing an aliphatic group joined through a carbon atom of the aliphatic group to its nuclear nitrogen atom and wherein said aliphatic group contains a

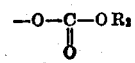

group, wherein $R_2$ represents a member selected from the group consisting of alkyl, cycloalkyl, allyl, phenyl and furyl attached thereto.

5. The azo compounds having the general formula:

wherein A represents the residue of a member selected from the group consisting of an aryl nucleus of the benzene series and a benzothiazole nucleus and R represents a phenmorpholine nucleus containing an aliphatic group joined through a carbon atom of the aliphatic group to its nuclear nitrogen atom and wherein said aliphatic group contains a

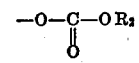

group, wherein $R_2$ represents a member selected from the group consisting of alkyl, cycloalkyl, allyl, phenyl and furyl attached thereto.

6. The azo compounds having the general formula:

wherein A represents the residue of an aryl nucleus of the benzene series, and R represents a phenyl nucleus containing an aliphaticamino group in para position to the azo bond, said aliphaticamino group having a

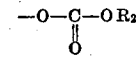

group, wherein $R_2$ represents a member selected from the group consisting of alkyl, cycloalkyl, allyl, phenyl and furyl attached thereto.

7. The azo compounds having the general formula:

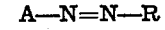

wherein A represents the residue of a member selected from the group consisting of an aryl nucleus of the benzene series and a benzothiazole nucleus, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

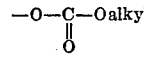

group attached to its aliphatic portion wherein said tetrahydroquinoline and phenmorpholine nuclei contain an aliphatic group joined to a carbon atom of the aliphatic group to their nuclear nitrogen atom and wherein said aliphatic group contains a

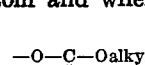

group attached thereto.

8. The azo compounds having the general formula:

$$A-N=N-R$$

wherein A represents the residue of an aryl nucleus of the benzene series, and R represents a phenyl nucleus containing an aliphatic amino group in para position to the azo bond, said aliphatic amino group having a

group attached to its aliphatic portion.

9. Material made of or containing an organic derivative of cellulose and wherein said organic derivative of cellulose is colored with a nuclear non-sulfonated azo dye compound having the general formula:

$$A-N=N-R$$

wherein A represents the residue of a member selected from the group consisting of an aryl nucleus of the benzene series and a benzothiazole nucleus, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

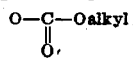

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom wherein said aliphatic group contains a

group, wherein $R_2$ has the meaning given above, attached thereto.

10. Material made of or containing an organic derivative of cellulose and wherein said organic derivative of cellulose is colored with a nuclear non-sulfonated azo dye compound having the general formula:

$$A-N=N-R$$

wherein A represents the residue of an aryl nucleus of the benzene series, R represents a member selected from the group consisting of a phenyl nucleus, a naphthyl nucleus, a tetrahydroquinoline nucleus and phenmorpholine nucleus, wherein said phenyl and naphthyl nuclei contain an aliphaticamino group in para position to the azo bond, said aliphaticamino group having a

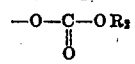

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

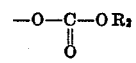

group, wherein $R_2$ has the meaning given above, attached thereto.

11. Material made of or containing an organic derivative of cellulose and wherein said organic derivative of cellulose is colored with a nuclear non-sulfonated azo dye compound having the general formula:

$$A-N=N-R$$

wherein A represents the residue of an aryl nucleus of the benzene series, and R represents a phenyl nucleus containing an aliphaticamino group in para position to the azo bond, said aliphaticamino group having a

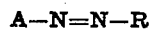

group, wherein $R_2$ represents a member selected from the group consisting of alkyl, cycloalkyl, allyl, phenyl and furyl attached thereto.

12. A cellulose acetate colored with a nuclear non-sulfonated azo dye compound having the general formula:

$$A-N=N-R$$

wherein A represents the residue of a member selected from the group consisting of an aryl nucleus of the benzene series and a benzothiazole nucleus, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

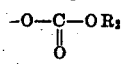

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

group, wherein $R_2$ has the meaning given above, attached thereto.

13. A cellulose acetate colored with a nuclear non-sulfonated azo dye compound having the general formula:

$$A-N=N-R$$

wherein A represents the residue of an aryl nucleus of the benzene series, R represents a member selected from the group consisting of a phenyl nucleus, a naphthyl nucleus, a tetrahydroquinoline nucleus and a phenmorpholine nucleus, wherein said phenyl and naphthyl nuclei contain an aliphaticamino group in para position to the azo bond, said aliphaticamino group having a

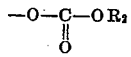

group, wherein $R_2$ represents a member selected from the group consisting of alkyl, cycloalkyl, allyl, phenyl and furyl, attached to its aliphatic portion, wherein said tetrahydroquinoline and phenmorpholine nuclei contain an aliphatic group joined through a carbon atom of the aliphatic group to their nuclear nitrogen atom and wherein said aliphatic group contains a

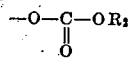

group, wherein $R_2$ has the meaning given above, attached thereto.

14. A cellulose acetate colored with a nuclear non-sulfonated azo dye compound having the general formula:

A—N=N—R wherein A represents the residue of an aryl nucleus of the benzene series, and R represents a phenyl nucleus containing an aliphaticamino group in para position to the azo bond, said aliphaticamino group having a $$-O-\underset{\underset{O}{\|}}{C}-OR_2$$

group, wherein $R_2$ represents a member selected from the group consisting of alkyl, cycloalkyl, allyl, phenyl and furyl attached thereto.

15. A cellulose acetate colored with a nuclear non-sulfonated azo dye compound having the general formula:

A—N=N—R wherein A represents the residue of an aryl nucleus of the benzene series, and R represents a phenyl nucleus containing an aliphaticamino group in para position to the azo bond, said aliphaticamino group having a $$-O-\underset{\underset{O}{\|}}{C}-Oalkyl$$

group attached to its aliphatic portion.

JOSEPH B. DICKEY.
JAMES G. McNALLY.